United States Patent

Yamauchi et al.

Patent Number: 5,204,597
Date of Patent: Apr. 20, 1993

[54] EXTERNALLY EXTENDED TYPE PROGRAMMABLE CONTROLLER

[75] Inventors: Takashi Yamauchi; Akira Sakagami, both of Minamitsuru, Japan

[73] Assignee: Fanuc Ltd, Minamitsuru, Japan

[21] Appl. No.: 582,200

[22] PCT Filed: Jan. 25, 1990

[86] PCT No.: PCT/JP90/00091
§ 371 Date: Sep. 28, 1990
§ 102(e) Date: Sep. 28, 1990

[87] PCT Pub. No.: WO90/08989
PCT Pub. Date: Aug. 9, 1990

[30] Foreign Application Priority Data

Feb. 1, 1989 [JP] Japan ............................... 1-23505

[51] Int. Cl.⁵ .............................................. G05B 19/18
[52] U.S. Cl. ..................................... 318/567; 318/569; 364/474.11
[58] Field of Search ................. 318/569, 567; 364/191, 364/474.11, 474.01

[56] References Cited

U.S. PATENT DOCUMENTS

| | | | |
|---|---|---|---|
| 4,683,549 | 7/1987 | Takaki | 364/191 X |
| 4,754,427 | 6/1988 | Okayama | 364/132 X |
| 4,912,384 | 3/1990 | Kinoshita et al. | 318/569 |
| 4,982,335 | 1/1991 | Inobe et al. | 364/474.01 |
| 5,005,134 | 4/1991 | Nakashima et al. | 364/434.11 |

Primary Examiner—William M. Shoop, Jr.
Attorney, Agent, or Firm—Staas & Halsey

[57] ABSTRACT

Disclosed is an externally extended programmable controller in which a part of a control function is independently provided as an external unit, which comprises a main programmable machine controller (PMC) (2) contained in a numerically controlled apparatus (CNC) (1) and controlled in response to commands from the numerically controlled apparatus (1), an I/O unit (3) connected to the main PMC (2) for transmitting and receiving signals to and from a mechanical unit A (61), and an extended PMC connected to the main PMC unit through the I/O unit (3) for controlling a particular mechanical unit by an independent sequence program, and the extended PMC (4) independently contains a sequence program for a mechanical unit B (62) to be controlled, and controls the mechanical unit by transmitting and receiving commands and various data to and from the main PMC (2) by a communication means.

4 Claims, 2 Drawing Sheets

EXTERNALLY EXTENDED TYPE PROGRAMMABLE CONTROLLER

TECHNICAL FIELD

The present invention relates to an externally extended type programmable controller in which a part of the control functions thereof is independently provided as an external unit, and more specifically, to an externally extended type programmable controller in which a control function of a sequence program regarding particular mechanical units is independently provided as an external unit.

BACKGROUND ART

Two kinds of programmable controllers (PC) are generally used: one as an independent unit; and the other as a unit contained in a numerical control apparatus (CNC). Hereinafter, the PC contained in the numerical control apparatus is referred to as a programmable machine controller (PMC).

FIG. 3 is a wiring diagram of a conventional PMC, in which a PMC 20 is contained in a numerical control apparatus 10. A sequence program for controlling the particular operations of mechanical units A 61 and B 62 is stored in the PMC 20 and controls the mechanical unit A 61 through an I/O circuit 31 and the mechanical unit B 62 through an I/O circuit 32 in response to a command.

The operation of some of the mechanical units controlled by the PMC 20 for example, an automatic pallet changer (APC), loader and the like, are independently effected, because a sequence program, for example, controlling these mechanical units can be more easily debugged when they are handled independently.

Nevertheless, when a sequence program for all of the wired mechanical units is stored in the PMC 20, as in prior art, all of the mechanical units must be wired when debugging is carried out.

Further, when another mechanical unit is to be added later, a necessary modification of the sequence program is very cumbersome.

DISCLOSURE OF THE INVENTION

Taking the above into consideration, an object of the present invention is to provide an externally extended type programmable controller in which a control function of a sequence program regarding particular mechanical units is independently provided as an external unit.

To solve the above problem, in accordance with the present invention, there is provided an externally extended programmable controller in which a part of control functions is independently provided as an external unit, which comprises a main programmable controller (PC) unit contained in a numerical control apparatus (CNC) and controlled in response to a command from the numerical control apparatus, an I/O unit connected to the main PC for transmitting and receiving signals to and from a predetermined mechanical unit, an extended PC connected to the main PC for controlling a particular mechanical unit by an independent sequence program, and a communication means for connecting the main PC, the I/O unit, and the extended PC.

The extended PC independently stores the sequence programs for the mechanical units to be controlled, and controls the mechanical units by transmitting and receiving commands and various data to and from the main PC through a communication means. A connection of a program creating device to the extended PC enables programs to be input, edited and debugged therefrom.

BEST MODE OF CARRYING OUT THE INVENTION

An embodiment of the present invention will be described below with reference to the drawings.

Figure 1:
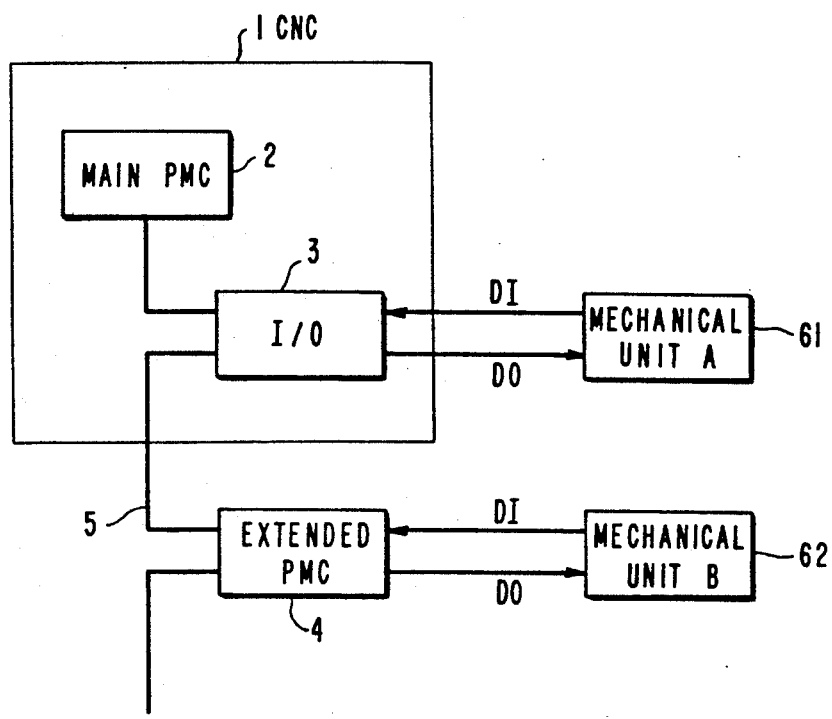
FIG. 1 is a wiring diagram of an embodiment of an externally extended programmable controller according to the present invention.

FIG. 1 is a wiring diagram of an embodiment of an externally extended programmable controller according to the present invention, wherein a numerical control apparatus 1 contains the main PMC 2 of a main PC. The main PMC 2 stores a sequence program for a mechanical unit A 61 and controls the operation of the mechanical unit A 61 through an I/O circuit 3, in response to commands.

On the other hand, an extended PMC 4 of an extended PC independently stores a sequence program for a mechanical unit B 62 and control same by transmitting and receiving commands and various data to and from the main PMC 2 through a communication line 5. Usually, the extended PMC 4 is provided in the mechanical unit B 62.

Figure 2:
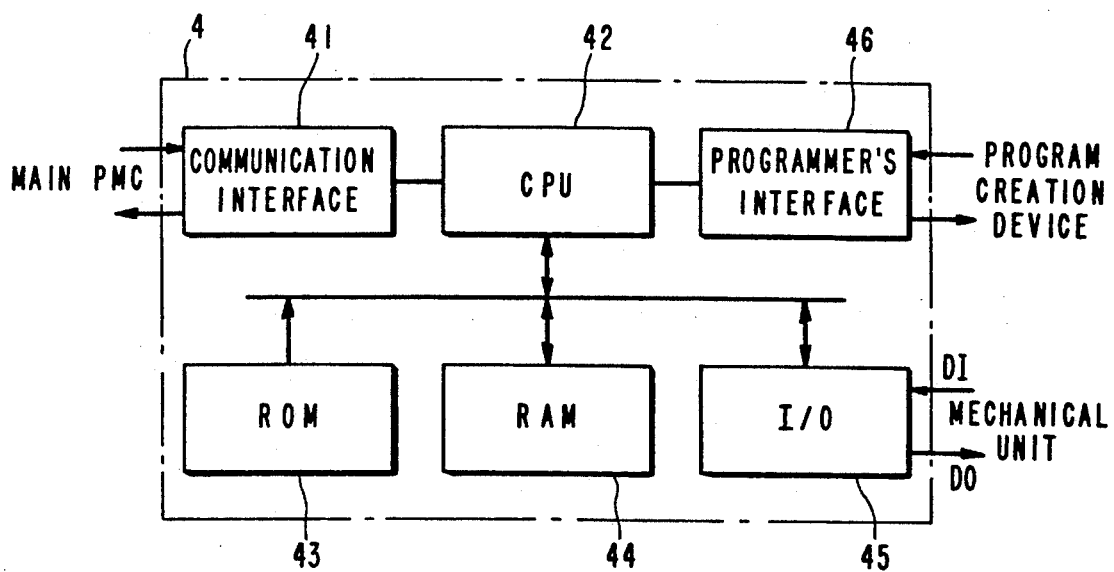
FIG. 2 is a block diagram showing the inner arrangement of an extended PMC in the embodiment according to the present invention.
Figure 3:
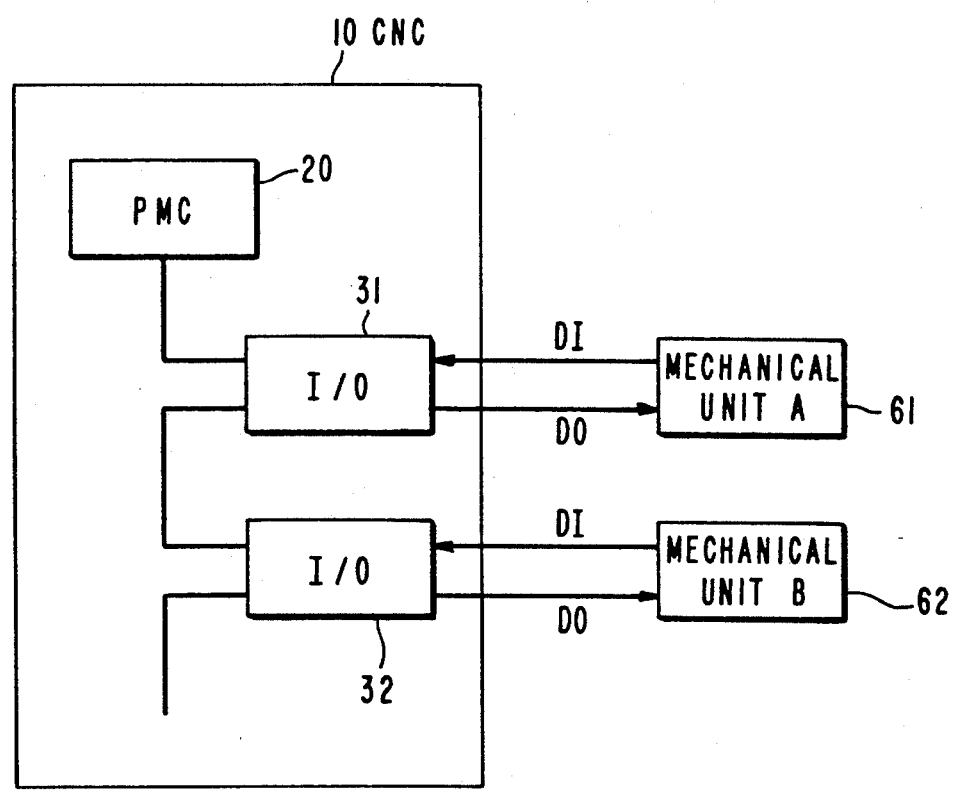
FIG. 3 is a wiring diagram of a conventional PMC.

FIG. 2 is a block diagram showing the inner arrangement of the extended PMC 4. The extended PMC 4 comprises a communication interface 41 composed of an RS 422 or RS 232C for communicating with the main PMC, a processor 42 for controlling the operation as a whole, a ROM 43 in which a control program is stored, a RAM 44 in which a sequence program for the mechanical unit is stored, an I/O circuit 45 for transmitting and receiving signals to and from the mechanical unit, and a programmer's interface 46 to which a portable program creation device is connected. Note that the communication interface 41 may be contained in the processor 42.

The processor 42 executes an arithmetic operation and processing in accordance with the sequence program stored in the RAM 44 in response to commands and various data transmitted from the PMC through the communication interface 41 and signals input from the mechanical units, and outputs signals to thereby control the mechanical units. Further, the processor 42 transmits the result of the processing to the main PC as data.

In addition, a connection of the portable program creation device to the programmer's interface 46 enables the sequence program stored in the RAM 44 to be debugged and a new sequence program to be input and edited.

As described above, according to the present invention, a function for controlling the sequence program for particular mechanical units is independently provided as the externally extended PC and connected to the main PC through the communication line, and thus the sequence program can be debugged for each mechanical unit, for example, an APC, loader and the like.

Further, when an other mechanical unit is provided later, the sequence program can be easily modified.

Furthermore, since the function for controlling the main PC is not used, the overall processing speed can be improved.

We claim:

1. An externally extended programmable control system operatively coupled to first and second mechanical units and including a part of a numerical control apparatus, the first and second mechanical units each generating signals in response to respective operations performed by the first and second mechanical units, comprising:
    a main programmable controller (PC) contained in the numerical control apparatus (CNC) and receiving a command from the numerical control apparatus, for generating first control signals for control of the first mechanical unit based on at least one of the command and the signals generated by the first mechanical unit;
    an I/O unit connected to said main PC, for transmitting the first control signals to the first mechanical unit, and for transmitting the signals generated by the first mechanical unit to said main programmable controller;
    an extended PC externally coupled to said main PC, for generating second control signals based on at least one of the command and the signals generated by the second mechanical unit, for control of the second mechanical unit using an independent sequence program; and
    communication means for connecting said main PC, said I/O unit, and said extended PC.

2. An extended programmable controller according to claim 1, wherein said extended PC comprises a processor, a communication interface connecting said processor to said communication means, a memory in which a control program is stored, a memory in which a sequence program for said second mechanical unit is stored, an I/O circuit for transmitting the second control signals to the second mechanical unit and receiving the signals generated by the second mechanical unit from said second mechanical unit, and an interface connecting said processor to an external program creation device.

3. An extended programmable controller externally coupled to a main programmable machine controller associated with a first mechanical unit and provided in a numerical control apparatus, said extended programmable controller being associated with a second mechanical unit, comprising:
    a communication interface for receiving and sending commands and data to and from the main programmable machine controller;
    a read-only memory (ROM) for storing a control program;
    an input/output (I/O) unit for receiving and sending signals to and from the second mechanical unit;
    a random-access memory (RAM) for storing a sequence program for the second mechanical unit; and
    a central processing unit (CPU) operatively coupled to said communication interface, said ROM, said I/O unit, and said RAM, for generating signals provided to said I/O unit for control of the second mechanical unit based on the commands and data from the main programmable machine controller, the control program from said ROM, the signals from said I/O unit, and the sequence program from said RAM.

4. An extended programmable controller according to claim 3,
    wherein said extended programmable controller is coupled to a program editing device, said extended programmable controller further comprising:
    a programming interface coupled to said CPU and the program editing device, for receiving and sending signals to edit the sequence program stored in said RAM.

* * * * *